United States Patent
Looney et al.

(10) Patent No.: US 6,367,563 B1
(45) Date of Patent: Apr. 9, 2002

(54) METHOD AND DEVICE FOR REMOVING A NON-AQUEOUS PHASE LIQUID FROM A GROUNDWATER SYSTEM

(75) Inventors: Brian B. Looney; Joseph Rossabi, both of Aiken, SC (US); Brian D. Riha, Augusta, GA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/585,539

(22) Filed: Jun. 2, 2000

(51) Int. Cl.[7] ............................................... E21B 49/08
(52) U.S. Cl. ...................................... 175/20; 73/864.74
(58) Field of Search ...................... 166/264; 175/58–60, 175/19–22; 73/864.74

(56) References Cited

U.S. PATENT DOCUMENTS

| | | | | |
|---|---|---|---|---|
| 4,804,050 A | * | 2/1989 | Kerfoot ........................ | 175/20 |
| 5,252,000 A | * | 10/1993 | Mohs .......................... | 405/53 |
| 5,669,454 A | * | 9/1997 | Cordry ........................ | 175/20 |

FOREIGN PATENT DOCUMENTS

DE    003722653 A1 *  1/1989

* cited by examiner

*Primary Examiner*—David Bagnell
*Assistant Examiner*—Zakiya Walker
(74) *Attorney, Agent, or Firm*—James C. Durkis; John T. Lucas; Virginia B. Caress

(57) ABSTRACT

A device for removing a non-aqueous phase liquid from a groundwater system includes a generally cylindrical push-rod defining an internal recess therein. The push-rod includes first and second end portions and an external liquid collection surface. A liquid collection member is detachably connected to the push-rod at one of the first and second end portions thereof. The method of the present invention for removing a non-aqueous phase liquid from a contaminated groundwater system includes providing a lance including an external hydrophobic liquid collection surface, an internal recess, and a collection chamber at the bottom end thereof. The lance is extended into the groundwater system such that the top end thereof remains above the ground surface. The liquid is then allowed to collect on the liquid collection surface, and flow downwardly by gravity into the collection chamber to be pumped upwardly through the internal recess in the lance.

4 Claims, 1 Drawing Sheet

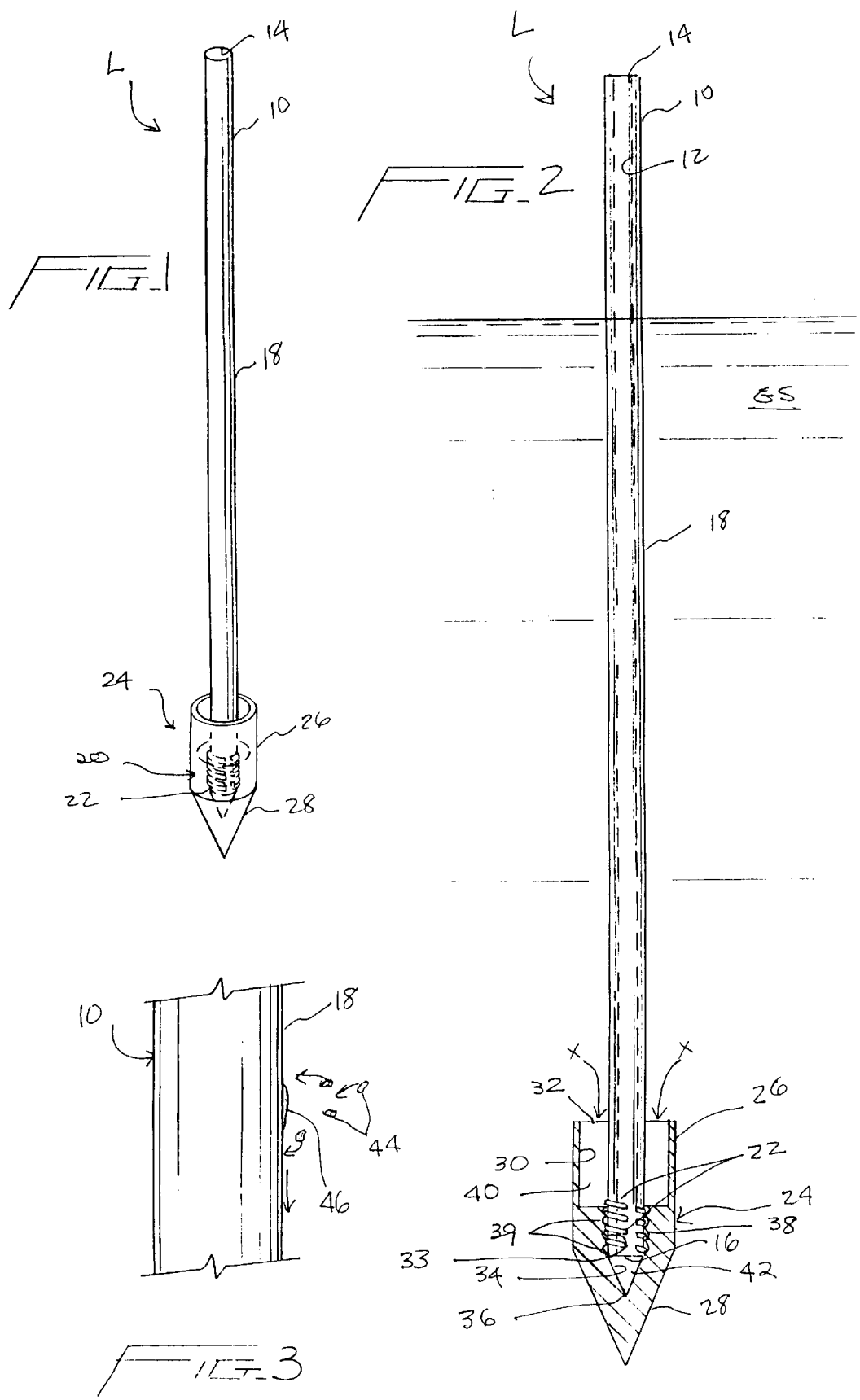

METHOD AND DEVICE FOR REMOVING A NON-AQUEOUS PHASE LIQUID FROM A GROUNDWATER SYSTEM

This invention was made with Government support under contract No. DE-AC 09-89SR18035 awarded by the U.S. Department of Energy. The Government has certain rights in the invention.

FIELD AND HISTORICAL BACKGROUND OF THE INVENTION

The present invention is directed to groundwater remediation, and more particularly to a method and device for removing a non-aqueous phase liquid from a contaminated groundwater system.

The present techniques for removing contaminants from a groundwater system consist of either pump and treat systems or in-situ systems using peat, microbes or biomasses. The present systems are, however, complicated, expensive to operate and require significant manpower.

In addition, prior art is available which teaches incorporating hydrophobic surfaces. However, these techniques involve medical uses or general use filter systems. It is also known to use hydrophobic surfaces for separation of liquids in a solution. The use of hydrophobic surfaces as collection surfaces, is not, however, known.

In view of the drawbacks associated with conventional techniques and equipment, there is a need in the industry for a simple and inexpensive technique and device for removing a non-aqueous phase liquid from a groundwater system.

OBJECTS AND SUMMARY OF THE INVENTION

The principal object of the present invention is to provide a method and device for in situ removal of a non-aqueous phase liquid from a groundwater system that overcomes the drawbacks associated with the conventional techniques and devices.

Another object of the present invention is to provide a device for removing a non-aqueous phase liquid from a groundwater system that is simple to operate, flexible, and can be easily customized to the collection rates of various non-aqueous phase liquids at different sites.

Yet another object of the present invention is to provide a method and device for removing a non-aqueous phase liquid from a groundwater system which can efficiently collect the dense non-aqueous phase liquids (DNAPLs) from various sites where the non-aqueous phase is present as dispersed droplets within the bulk groundwater.

Still yet another object of the present invention is to provide a method and device for removing a non-aqueous phase liquid from a groundwater system which removes DNAPLs at a rate consistent with the natural ability of the material to move through the formation thereby minimizing the amount of secondary water waste being generated.

An additional object of the present invention is to provide a method and device for removing a non-aqueous phase liquid from a groundwater system which induces a driving force towards the collection point generating "free pumping" of the DNAPLs, in the event a continuous DNAPLs phase is present.

Yet an additional object of the present invention is to provide a device for removing a non-aqueous phase liquid from a groundwater system the installation of which is simple, reliable and inexpensive. Therefore, the device can be easily massproduced and installed at various locations at reasonable costs.

Still yet an additional object of the present invention is to provide a device for removing non-aqueous phase liquid from a groundwater system which collects DNAPLs through interaction with a hydrophobic surface. In other words, the device of the present invention works on the principle that industrial solvents exhibit preference to wet hydrophobic surfaces in the presence of water. The density of the dense solvent causes it to flow to the bottom of the device for pumping to the surface using a micro-lift pump approach.

An additional object of the present invention is to provide a method for removing a non-aqueous phase dense liquid from the groundwater system in which the DNAPLs contact the hydrophobic collection surface of the device thereby coating it as a thin film and flow down to the bottom of the device by gravity where they are pumped upwardly to a surface collection unit.

In accordance with the present invention, a device for removing a non-aqueous phase liquid from a groundwater system includes a generally cylindrical push-rod defining a recess therein. The push-rod includes first and second end portions and an external liquid collection surface. A liquid collection member is detachably connected to the push-rod at one of the first and second end portions thereof.

The method of the present invention for removing a non-aqueous phase liquid from a contaminated groundwater system includes providing a lance including an external hydrophobic liquid collection surface, an internal recess, and a collection chamber at the bottom end thereof. The lance is extended into the groundwater system such that the top end thereof remains above the ground surface. The liquid is then allowed to collect on the liquid collection surface, and flow downwardly by gravity into the collection chamber to be pumped upwardly through the recess in the lance.

BRIEF DESCRIPTION OF THE DRAWINGS

The above and other objects, novel features and advantages of the present invention will become apparent from the following detailed description of the invention as illustrated in the drawings, in which:

FIG. 1 is a vertical perspective view of the device of the present invention;

FIG. 2 is an enlarged vertical sectional view of the device of FIG. 1, shown positioned in an underground water system; and FIG. 3 is an enlarged view of a portion of the push-rod of the device illustrating collection of DNAPLs on the surface thereof.

DETAILED DESCRIPTION OF THE INVENTION

As best shown in FIGS. 1–2, the device of the present invention or lance L, includes an elongated, generally cylindrical push-rod or pipe 10 defining an internal recess 12 therein. The pipe 10 includes a top opening 14 and a bottom opening 16. The pipe 10 is preferably a hydrophobic Teflon® pipe, or a pipe with an external hydrophobic surface 18. The surface 18 may be made of a microporous hydrophobic material, such as Gore-Tex®. The bottom end 20 of the pipe 10 includes screw-threads.

A generally cone-shaped liquid collection member 24 is provided to be detachably connected to the bottom end 20 of the pipe 10. In particular, the collection chamber 24 includes a generally cylindrical upper portion 26 and a generally cone-shaped lower contiguous portion 28. The cone-shaped portion 28 facilitates installation of the lance L into a groundwater system GS by pushing therethrough.

The cylindrical portion 26 includes a large diameter internal recess 30 communicating with the exterior through a top opening 32 and a smaller diameter recess 33. The cone-shaped portion 28 also includes a recess 34 which is closed at bottom 36, but is in communication with the recess 33.

As best shown in FIG. 2, the recess 33 includes screw-threads 38 that engage with the screw-threads 22 of pipe 10. The threads 38 include radially extending cut-outs 39. Upon installation of the pipe 10 into the member 24, an inward liquid flow chamber 40 and a liquid collection chamber 42 are defined in the cylindrical portion 26 and the cone-shaped portion 28, respectively. The liquid flows inwardly into the flow chamber 40 (shown by arrows X), and then gets collected in the chamber 42 by flowing through cut-outs 39.

USE AND OPERATION

The lance L of the present invention is typically installed into a groundwater system GS using a conventionally known direct push method, such as a cone penetrometer. Upon placement into the groundwater system GS, the installation rods (not shown) are withdrawn exposing the pipe 10. The DNAPLs (shown by blobs 44 in FIG. 3) move toward the hydrophobic surface 18 and form a thin film 46, and move down the pipe 10 via gravity towards and into the liquid flow chamber 40. From there, the liquid flows into the collection chamber 42 via the cut-outs 39, and due to the force of the liquid flow and density, flows upwardly to a collection unit (not shown) through the internal recess 12 of the pipe 10.

While this invention has been described as having preferred ranges, steps, materials, or designs, it is understood that it is capable of further modifications, uses and/or adaptations of the invention following in general the principle of the invention, and including such departures from the present disclosure, as those come within the known or customary practice in the art to which the invention pertains and as may be applied to the central features hereinbefore set forth, and fall within the scope of the invention and of the appended claims. It is further understood that the present invention is not limited to the claims appended hereto.

What is claimed is:

1. A device for removing a non-aqueous phase liquid from a groundwater system, comprising:
   a) a generally cylindrical push-rod defining a recess therein;
   b) said push-rod including top and bottom ends;
   c) said push-rod including an external hydrophobic liquid collection surface;
   d) a liquid collection member detachably connected to said push-rod at said bottom end thereof;
   e) said liquid collection member includes a generally cone-shaped portion and a contiguous generally cylindrical portion;
   f) said cylindrical portion and said cone-shaped portion each defines an internal recess contiguous to each other;
   g) said internal recess in said cylindrical portion includes screw-threads;
   h) said bottom end of said push-rod includes screw-threads on the external surface thereof to be in operational engagement with the screw-threads in the internal recess of said cylindrical portion;
   i) said bottom end of said push-rod includes an end opening to be in fluid communication with the recess in said cone-shaped portion;
   j) said screw-threads in the internal recess of said cylindrical portion include radially extending cut-out portions; and
   k) said recesses in said cylindrical portion and said cone-shaped portion are in fluid communication with each other when said push-rod is connected with said liquid collection member.

2. The device of claim 1, wherein said cylindrical portion includes an
   opening communicating with the exterior of the device.

3. A lance for removing a non-aqueous phase liquid from a groundwater system, comprising:
   a) a push-rod defining a recess therein;
   b) said push-rod including top and bottom ends;
   c) said push-rod including an external hydrophobic liquid collection surface;
   d) a liquid collection member detachably connected to said push-rod at said bottom end thereof;
   e) said liquid collection member includes a generally cone-shaped portion and a contiguous generally cylindrical portion;
   f) said cylindrical portion and said cone-shaped portion each defines an internal recess contiguous to each other;
   g) said internal recess in said cylindrical portion includes screw-threads;
   h) said bottom end of said push-rod includes screw threads on the external surface thereof to be in operational engagement wit the screw-threads in the internal recess of said cylindrical portion;
   i) said bottom end of said push-rod includes an end opening to be in fluid communication with the recess in said cone-shaped portion;
   j) said screw-threads in the internal recess of said cylindrical portion include radially extending cut-out portions; and
   k) said recesses in said cylindrical portion and said cone-shaped portion are in fluid communication with each other when said push-rod is connected with said liquid collection member.

4. The lance of claim 3, wherein said cylindrical portion includes an
   opening communicating with the exterior of the lance.

\* \* \* \* \*